United States Patent
Ichikawa et al.

(10) Patent No.: US 6,173,028 B1
(45) Date of Patent: Jan. 9, 2001

(54) APPARATUS FOR PROMOTING INTERMIXING OF HEATED COOLANT STREAMS IN NUCLEAR REACTOR

(75) Inventors: Toshio Ichikawa; Yoko Matsushima, both of Tokyo; Takehiko Tsutsui, Hyogo-ken; Chikara Kurimura, Hyogo-ken; Hajime Izumi, Hyogo-ken, all of (JP)

(73) Assignee: Mitsubishi Heavy Industries, Ltd., Tokyo (JP)

( * ) Notice: Under 35 U.S.C. 154(b), the term of this patent shall be extended for 0 days.

(21) Appl. No.: 09/258,838

(22) Filed: Feb. 26, 1999

(30) Foreign Application Priority Data

Oct. 15, 1998 (JP) .................................................. 10-293918

(51) Int. Cl.[7] ............................ G21C 15/00; G21C 19/28
(52) U.S. Cl. ............................ 376/377; 376/373; 376/352
(58) Field of Search .................................. 376/352, 373, 376/377

(56) References Cited

U.S. PATENT DOCUMENTS

| | | | |
|---|---|---|---|
| 4,173,513 | * 11/1979 | Obermeyer et al. ................ | 176/50 |
| 4,752,438 | * 6/1988 | Desfontaines et al. ............ | 376/285 |
| 4,793,966 | * 12/1988 | Veronesi ............................. | 376/377 |
| 4,937,039 | * 6/1990 | Balog et al. ....................... | 376/353 |
| 5,553,107 | * 9/1996 | Schwirian et al. ................ | 376/352 |

FOREIGN PATENT DOCUMENTS

| | | | | |
|---|---|---|---|---|
| 5-312984 | * 11/1993 | (JP) | ..................................... | 376/353 |
| 972985 | 3/1997 | (JP) | ..................................... | 376/352 |
| 9-072985 | * 3/1997 | (JP) | ..................................... | 376/353 |

* cited by examiner

Primary Examiner—Charles T. Jordan
Assistant Examiner—Jack Keith
(74) Attorney, Agent, or Firm—Gottlieb, Rackman & Reisman, P.C.

(57) ABSTRACT

An apparatus for promoting intermixing of heated fluid streams within a nuclear reactor vessel is implemented in such structural configuration and disposition as to be capable of not only promoting uniform temperature distribution of a heated fluid stream flowing into an outlet nozzle but also reducing flow resistance which the heated fluid encounters within a upper plenum of the reactor vessel. The apparatus is disposed within a upper plenum (40) defined within a nuclear reactor vessel (10) of a nuclear reactor above a core having a low temperature region (a) and a high temperature region (d) where a heated fluid flows at a low temperature and a high temperature, respectively. The upper plenum (40) is hydraulically communicated to outlet nozzles (12) installed at a side wall of the nuclear reactor vessel (10). The apparatus includes heated fluid guide members each having a predetermined short length and installed within the upper plenum (40) for guiding a heated fluid (b') flowing out from the low temperature region of the reactor core to the vicinity of the outlet nozzle (12).

6 Claims, 5 Drawing Sheets

APPARATUS FOR PROMOTING
INTERMIXING OF HEATED COOLANT
STREAMS IN NUCLEAR REACTOR

BACKGROUND OF THE INVENTION

1. Field of the Invention

The present invention relates to an apparatus or structure for promoting intermixing of heated coolant streams within a upper plenum of a nuclear reactor, which plenum is disposed above a reactor core in which heat exchange takes place between fuel rods and a coolant such as light water and which has high and low temperature regions where the coolant is heated to high and low temperatures, respectively. More particularly, the invention is concerned with a structural configuration and disposition of internal component members disposed within the upper plenum at locations substantially corresponding to an outer periphery of a fuel region.

2. Description of Related Art

In a power reactor, heat generated internally of fuel rods is transferred to a coolant such as light water or the like for utilization as energy. In other words, heat exchange is carried out between the nuclear fuel and the coolant. For a better understanding of the invention, background techniques thereof will be reviewed below. FIG. 3 of the accompanying drawings shows an internal structure of a pressurized water reactor, a typical nuclear reactor. Referring to the figure, there are accommodated within a nuclear reactor vessel 10 core internals inclusive of nuclear fuel assemblies, control rods, control rod cluster guide tubes, a coolant and others. In general, the nuclear reactor vessel 10 is integrally provided with inlet nozzles 11 and outlet nozzles 12 for the reactor coolant which is light water, wherein a core barrel 30 is suspended vertically within the nuclear reactor vessel 10. The number of the inlet nozzles 11 and the outlet nozzles 12, respectively, coincide with the number of coolant circulation loops which in turn is determined in dependence on the output power rating of the reactor. Ordinarily, the number of the inlet nozzles 11 as well as that of the outlet nozzles 12 is in a range of two to four. The inlet nozzles 11 as well as the outlet nozzles 12 are installed in the nuclear reactor vessel in a circumferential direction with predetermined distance therebetween. Disposed within the core barrel 30 at a lower portion thereof are a lower core support plate 32 and a lower core plate 31, each extending in a horizontal direction. A bottom plenum 41 is defined beneath the lower core support plate 32.

Mounted on the lower core plate 31 are a large number of fuel assemblies 33 which are disposed adjacent to one another to thereby constitute a reactor core. Further disposed above the fuel assembly 33 is an upper core plate 21 which is supported by an upper core support plate 20 by way of upper core support columns 23. The fuel assemblies 33 are pressed downwards by means, of the upper core plate 21 so that the fuel assemblies 33 are prevented from displacing upwards under the influence of buoyancy exerted by the flowing coolant. A plurality of control rod cluster guide tubes 22 are supported at lower ends thereof on the upper surface of the upper core plate 21 by means of supporting pins or the like (not shown). The control rod cluster guide tubes 22 extend upwardly through and beyond the upper core support plate 20. By withdrawing the control rod clusters (not shown either) from the reactor core through the medium of the control rod cluster guide tubes 22 or inserting the control rod clusters into the fuel assemblies 33 of the reactor core through the control rod cluster guide tubes 22, the thermal output of the reactor core can be adjusted.

FIG. 4 is a fragmentary enlarged view showing a structure above the fuel assembly 33. As can be seen in this figure, the upper core plate 21 and the upper core support plate 20 are interconnected by the upper core support columns 23 in order to ensure structurally high strength or robustness. Furthermore, the control rod cluster guide tubes 22 extending through the upper core support plate 20 are fixedly secured to the upper core support plate 20. Thus, the control rod cluster guide tubes 22 are protected against displacement or dislocation in a lateral or transverse direction. Defined between the upper core plate 21 and the upper core support plate 20 interconnected as mentioned above is a upper plenum 40.

Next, description will be directed to the flows or streams of light water employed as the coolant within the nuclear reactor vessel 10 realized in the structure described above. Referring to FIGS. 3 and 4, light water of low temperature fed to the nuclear reactor vessel 10 by way of the inlet nozzles 11 follows flow paths of such patterns as indicated by arrows in these figures. More specifically, light water fed to the nuclear reactor vessel 10 through the inlet nozzle 11 flows at first downwardly through an annular space defined between the outer surface of the core barrel 30 and the inner wall of the nuclear reactor vessel 10. The flowing direction of the light water is forced to turn upwards within the bottom plenum 41. Thereafter, light water flows into the reactor core after passing through the lower core support plate 32 and the lower core plate 31. Within the reactor core, light water flows upwardly substantially in parallel. In the course of flowing through the reactor core, heat generated by the fuel rods of the fuel assemblies is deprived of by light water, which results in temperature rise thereof. After passing through the upper core plate 21, the flowing direction of light water changes to a horizontal or transverse direction, being deflected under the stop action of the upper core support plate 20. Finally, light water leaves the nuclear reactor vessel 10 through the outlet nozzle 12 to be supplied to a steam generator (not shown) by way of an outlet pipe 42.

At this juncture, it should be mentioned that the reactor core which is constituted by a plurality of fuel assemblies 33 ordinarily undergoes periodical maintenance for fuel exchange such that about one third of the fuel is exchanged at the end of every operation cycle. Consequently, the core is constituted by three groups of fuel assemblies in correspondence to three cycles which differ from one another in respect to the degree of burn-up (hereinafter referred to as the burn-up degree). Thus, the output powers of the fuel assemblies 33 differ from one to another assembly in dependence on the burn-up degrees. Besides, in the core region where the control rods have been loaded for controlling the output power of the reactor as well as in the outer peripheral region of the core where leakage of neutron fluxes externally of the reactor occurs, there prevails neutron flux distribution of low density when compared with that in a center region of the core. As a consequence, power outputted from the outer peripheral portion or region of the reactor core is low when compared with that of the center region of the core.

Such being the circumstances, the flow behavior of light water within the reactor core will now be analyzed in more detail. Under the influence of the different neutron flux distributions within the reactor core such as described above, a stream (indicated by an arrow d in FIG. 4) of light water flowing through the center region of the core where the nuclear fission is vigorous is heated up to a relatively high temperature, whereon the light water heated to a high temperature leaves the core to flow into the upper plenum 40. In succession, high temperature light water flows along and through the control rod cluster guide tubes 22 disposed within the upper plenum 40 to impinge on the lower surface of the upper core support plate 20, whereby the flowing direction of the light water is deflected so that it flows substantially transversely through the upper plenum 40. Finally, light water flows out from the reactor through the outlet nozzle 12, as indicated by arrows e, f and g in FIG. 4.

On the other hand, a stream (indicated by an arrow a in FIG. 4) of light water flowing through the outer peripheral region of the core where the neutron flux density is relatively low will is heated to a relatively low temperature when compared with the stream d of the light water flowing through the center region of the core. Of course, light water of the stream a flows into the upper plenum 40. However, in this conjunction, it is noted that the peripheral stream of light water flowing toward the outlet nozzle 12 within the upper plenum 40 follows such flow paths as indicated by arrows b and c in FIG. 4. As can be seen in this figure, the peripheral stream light water flows through a region within the upper plenum 40 where flow resistance is relatively low because essentially no obstacles are present in this region located at the inner side of the core barrel 30. Consequently, low temperature light water can flow into the outlet nozzle 12 straightforwardly.

For the reasons mentioned above, within the outlet pipe 42 connected to the outlet nozzle 12, the peripheral light water stream of relatively low temperature tends to flow along a bottom portion of the outlet pipe 42, as indicated by the arrow c, while the center stream (i.e., light water stream having passed through the center region of the core) of a relatively high temperature follows a flow path along a top or ceiling portion of the outlet pipe 42, as indicated by the arrow g. In another words, there are formed within the outlet pipe 42 and the outlet nozzle 12 an upper layer or stream of high temperature light water and a lower layer or stream of low temperature light water. In other words, the flow of light water is stratified into layers of different temperatures within the outlet pipe 42 and the outlet nozzle 12. As a result of this, the light water flow assumes such a temperature distribution that a remarkable temperature gradient makes appearance in the coolant flow within the outlet pipe as well as succeeding pipes. Besides, when the light water streams having the temperature difference as mentioned above pass through reactor internals, vortexes are produced, involving fluctuation in the temperature of light water. These phenomena are likely to provide obstacle for measurement of a mean temperature (temperature on an average) of the coolant with accuracy. Parenthetically, such measurement is usually carried out by measuring the temperature of light water flowing through the piping system.

As the measures for coping with the undesirable phenomena described above, there has already been proposed a structure for promoting intermixing of heated coolant streams by changing the flow directions of the peripheral stream by means of internal component members each of which is realized in a specific structural configuration with a view to reducing the temperature difference between the heated coolant streams, as is disclosed in Japanese Patent Application Laid-open No. 9-72985. FIG. 5 of the accompanying drawings shows a hitherto known or conventional structure which has been developed to this end. As can be seen in the figure, slot-formed tubes 24 are disposed substantially along and over the whole outer periphery of the heat generating region. By virtue of the arrangement mentioned above, a part of light water of low temperature flowing out from the outer peripheral region of the core, as indicated by an arrow a in FIG. 5, can flow into the slot-formed tubes 24 mounted by appropriate means, as indicated by an arrow b' in FIG. 5, to enter the upper plenum 40 through the slots formed in the upper region of the slot-formed tubes 24 to be thereby deflected toward the outlet nozzle 12, as indicated by arrow c'. Owing to such flow pattern of light water or coolant streams, a part of the peripheral light water stream of a relatively low temperature flowing through the slot-formed tube 24 and the center light water stream of a high temperature passed through the center core region (indicated by arrows d and e) can intermingle or intermix with each other to an appropriate extent within the upper plenum 40. As a result of this, the temperature distribution of the coolant, flowing into the outlet nozzle 12 can be made uniform. Thus, light water can flow through the outlet pipe 42 with lesser temperature gradient.

However, the structure in which the low temperature light water is introduced into the slot-formed tubes 24 each having an increased outer diameter in order to guide the coolant upwardly to a height level near to the top of the outlet nozzle 12 from the height level of the upper core plate 21 necessarily becomes bulky because of the large outer diameter as compared with that of the upper core support columns 23 which are of course incapable of allowing the coolant to flow therethrough. As a result of this, channels for transverse or cross flows of light water toward the outlet nozzle 12 within the upper plenum 40 become narrow, involving increased flow resistance to the flow of the coolant. As a result of this, hydrodynamic load (fluid load) applied to the upper core support columns 23 and the control rod cluster guide tubes 22 increases, which in turn may exert adverse influence to the structural integrity of the control rod cluster guide tubes 22 among others.

Furthermore, in case the slot-formed tubes 24 are disposed between the upper core plate 21 and the upper core support plate 20 at all the available positions corresponding to the outer periphery of the reactor core except for the locations of the control rod cluster guide tubes disposed above the fuel assembly, the channel blockage ratio increases significantly as well. As a result of this, the flow resistance presented by the internal component members installed within the upper plenum 40 increases, whereby the hydrodynamic load applied to the control rod cluster guide tubes 22 will become about twice as high as the hydrodynamic or fluid load in the structure in which no slot-formed tubes 24 are provided. Such increase of the hydrodynamic load is undesirable from the viewpoint of safety as well in view of the fact that the control rod cluster guide tubes 22 are mounted on the upper core plate 21 at the lower ends thereof simply by means of supporting pins or the like, as described previously.

SUMMARY OF THE INVENTION

In the light of the state of the art described above, it is an object of the present invention to provide an apparatus or structure which can promote intermixing of heated coolant streams within a nuclear reactor vessel and which is realized in such structural configuration and disposition as to be capable of not only promoting uniform or even temperature distribution of a coolant flowing into an outlet nozzle but also reducing flow resistance which the coolant encounters within a upper plenum of the reactor vessel.

In view of the above and other objects which will become apparent as the description proceeds, the present invention is directed to an apparatus or structure for promoting intermixing of heated fluid streams in a nuclear reactor, which structure is disposed within a upper plenum defined within a nuclear reactor vessel of the nuclear reactor above a core having a low temperature region and a high temperature region where a heated fluid flows at a low temperature and a high temperature, respectively, wherein the upper plenum is hydraulically communicated to outlet nozzles installed at a side wall of the nuclear reactor vessel. According to a general aspect of the present invention, there is provided a coolant intermixing promoting structure which includes heated fluid guide members each formed in a short length and installed within the upper plenum for guiding the heated fluid flowing out from the low temperature region of the reactor core to the vicinity of the outlet nozzle.

By virtue of the arrangement described above, the fluid or coolant flowing through the outer peripheral region of the core and heated to a relatively low temperature is guided or introduced into a stream of the coolant passed through the high temperature region of the core and heated to a relatively high temperature to be mixed with the latter, as a result of which intermixing of the low-temperature coolant stream and the high-temperature coolant stream can be promoted, whereby the temperature distribution of the coolant flowing through the outlet nozzle and succeeding pipe can be made uniform. Thus, the stratification of the coolant flow within the outlet nozzle and the succeeding pipes and hence occurrence of temperature gradient across the flow section can be effectively suppressed. As a result of this, the mean temperature of the nuclear reactor can be measured with enhanced accuracy and reliability. Besides, because there exists no obstacles which block the flow of the high-temperature coolant stream toward the upper plenum, not only the hydrodynamic load applied to the structural member disposed within the upper plenum can be suppressed from increasing but also the temperature distribution within the outlet nozzle and the succeeding pipes can be much made uniform.

In a preferred mode for carrying out the invention, the length of the short-length heated fluid guide member should preferably be selected such that a top end thereof is positioned at a height lower than that of a bottom of a bore of the outlet nozzle and higher than a middle position between the bottom of the bore of the outlet nozzle and an upper surface of an upper core plate.

With the arrangement described above, the heated fluid guide members provide substantially no obstacle to the flow of the high-temperature coolant stream toward the outlet nozzle, whereby the hydrodynamic load applied to the internal component members disposed within the upper plenum can be prevented from increasing due to the provision of the heated fluid guide members.

In another mode for carrying out the invention, the heated fluid guide members of short length may preferably be disposed at available positions, respectively, in an outer peripheral portion of the upper plenum where neither upper core support columns nor control rod cluster guide tubes are disposed.

Thus, the heated fluid guide members can be installed with ease in the existing plant equipment.

In yet another mode for carrying out the invention, the heated fluid guide members of short length should preferably be disposed at positions in an outer peripheral portion of the upper plenum which corresponds to an outer peripheral portion of the reactor core.

With the arrangement described above, intermixing of the heated coolant streams of different temperatures can be greatly promoted.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
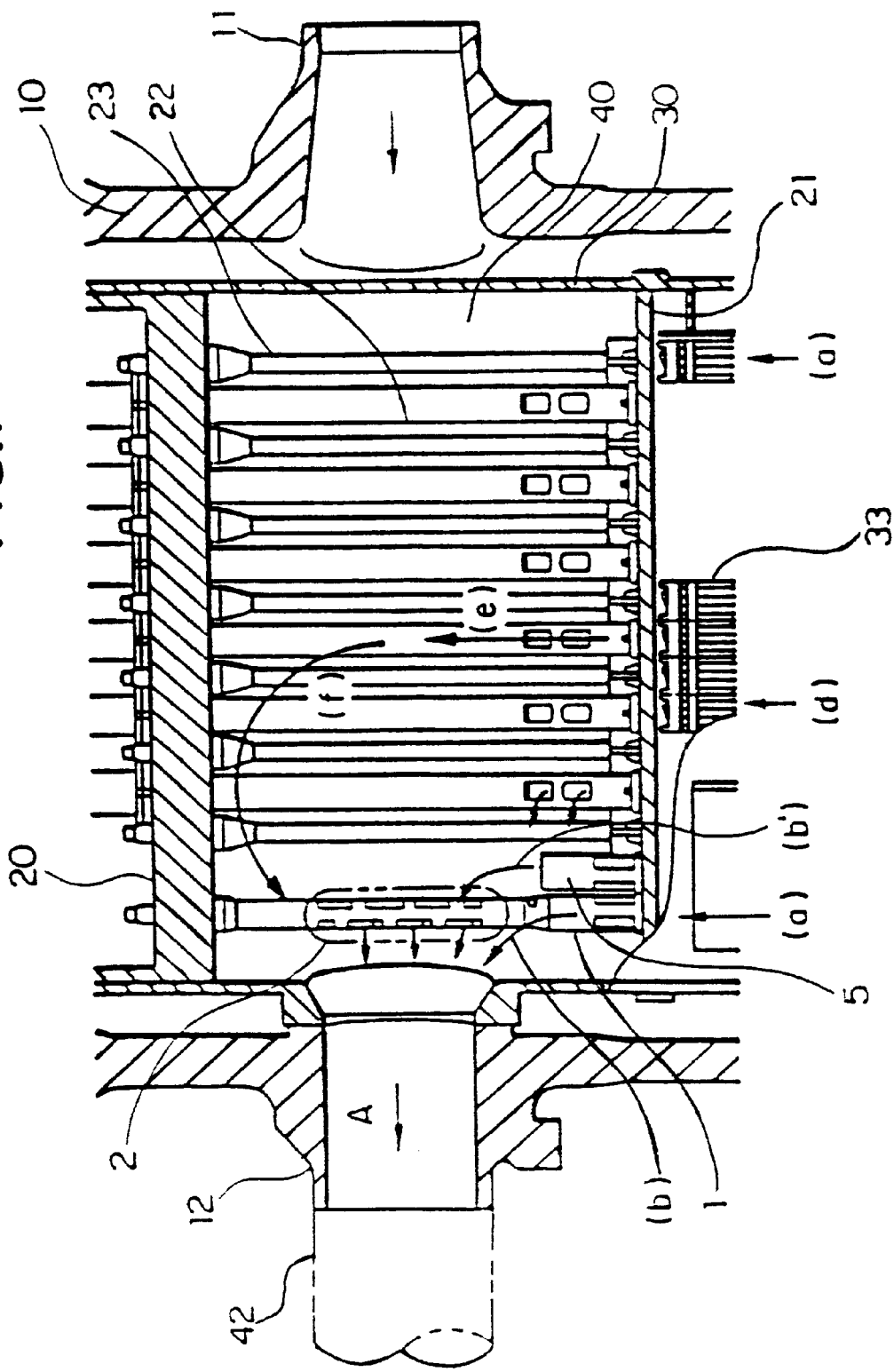
FIG. 1 is a partially enlarged view showing generally a major portion of a upper plenum and associated components of a pressurized water reactor equipped with heated fluid guide members according to an embodiment of the present invention.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "right", "left", "top", "bottom" and the like are words of convenience and are not to be construed as limiting terms.

FIG. 1 is a partially enlarged vertical sectional view showing in detail a structure of a upper plenum and associated components in a pressurized water reactor in which short-length tubes 5 are employed as the heated fluid guide members of short length according to an embodiment of the present invention. In the figure, the structural or component members of the pressurized water reactor are, for the most part, essentially the same as those of the conventional reactor described hereinbefore. Accordingly, repetitive description thereof will be unnecessary. In this conjunction, it should first be mentioned that the short-length tubes 5 serving as the heated fluid guide member according to the present invention can be installed additionally as fresh members or components at all available locations in an outer peripheral region within the upper plenum 40 which are not occupied by any existing internal component members. Alternatively, the short-length tubes 5 may be disposed restrictively only at locations in an outlet or exit region adjacent to the outlet nozzle 12.

The short-length tubes 5 according to an illustrated embodiment of the present invention are formed in a sleeve-like or tubular shape and have a top end and a bottom end both of which are opened. Thus, when the short-length tubes 5 are mounted on the upper core plate 21, the tubes 5 are brought into fluid communication with the reactor core by way of through-holes formed in the upper core plate 21 so that the coolant leaving the reactor core can flow into the short-length tubes 5 to flow therethrough, being ultimately ejected from the top open ends of the short-length tubes 5 into the upper plenum 40. At this juncture, it is to be mentioned that the overall length of the short-length tubes 5 should preferably be so selected that when they are moved on the upper core plate 21, the open top end of the short-length tubes 5 assume a height level or vertical position which is lower than the bottom of the bore of the outlet nozzle 12. More preferably, the length of the short-length tubes 5 should be so determined that the open top ends thereof are positioned substantially midway between the upper surface of the upper core plate 21 and the lower end of the outlet nozzle 12 in the mounted state. When the short-length tubes 5 have an excessively long length, the flow resistance to the coolant stream flowing through the upper plenum 40 toward the outlet nozzle 12 from the center portion of the core will increase to thereby exert undesirable influence on the strength of the structural members such as the upper core support columns 23 and the control rod cluster guide tubes 22. The short-length tubes 5 of the length determined as mentioned above can thus be mounted at all available locations on the upper core plate 21 substantially along the outer periphery of the core which are not occupied by existing structural members such as the upper core support columns, the control rod cluster guide tubes and others. Furthermore, with the length of the short-length tubes 5 mentioned above, the low temperature peripheral coolant stream can be positively discharged or introduced into the high temperature center coolant stream without fail under the effect of inertia of the coolant ejected from the short-length tubes 5. Furthermore, it should also be mentioned that the short-length tubes 5 can be installed within the upper plenum 40 with ease because of the short length thereof. Of course, the short-length tubes 5 can be installed in existing equipment without any appreciable accompanying difficulty.

Referring to FIG. 1, it can be seen that a slot-formed tube 1 is mounted adjacent to a short-length tube 5. The structure of the slot-formed tube 1 is disclosed in detail in Japanese Patent Application No. 10-284532 entitled "APPARATUS FOR PROMOTING INTERMIXING OF HEATED FLUID STREAMS IN A NUCLEAR REACTOR" filed by the inventor(s) of the present application. Parenthetically, the disclosure of this preceding application is incorporated herein by reference. Described briefly, the slot-formed tube 1 has an open bottom end so that when it is mounted on the upper core plate 21, the slot-formed tube 1 is brought into fluid communication with the reactor core by way of through-holes formed in the upper core plate 21. Further, a plurality of slots 2 are formed in the slot-formed tube 1 in a window-like fashion at locations corresponding to the height level (vertical position) of the outlet nozzle 12 installed in the nuclear reactor vessel 10. Parenthetically, it should also be mentioned that the slot-formed tube 1 has a reduced diameter portion reduced at a ratio of about 20% of the diameter substantially over two thirds of the whole length thereof in order to prevent excessive hydrodynamic load from being applied to the structural members disposed within the upper plenum 40.

Figure 2:
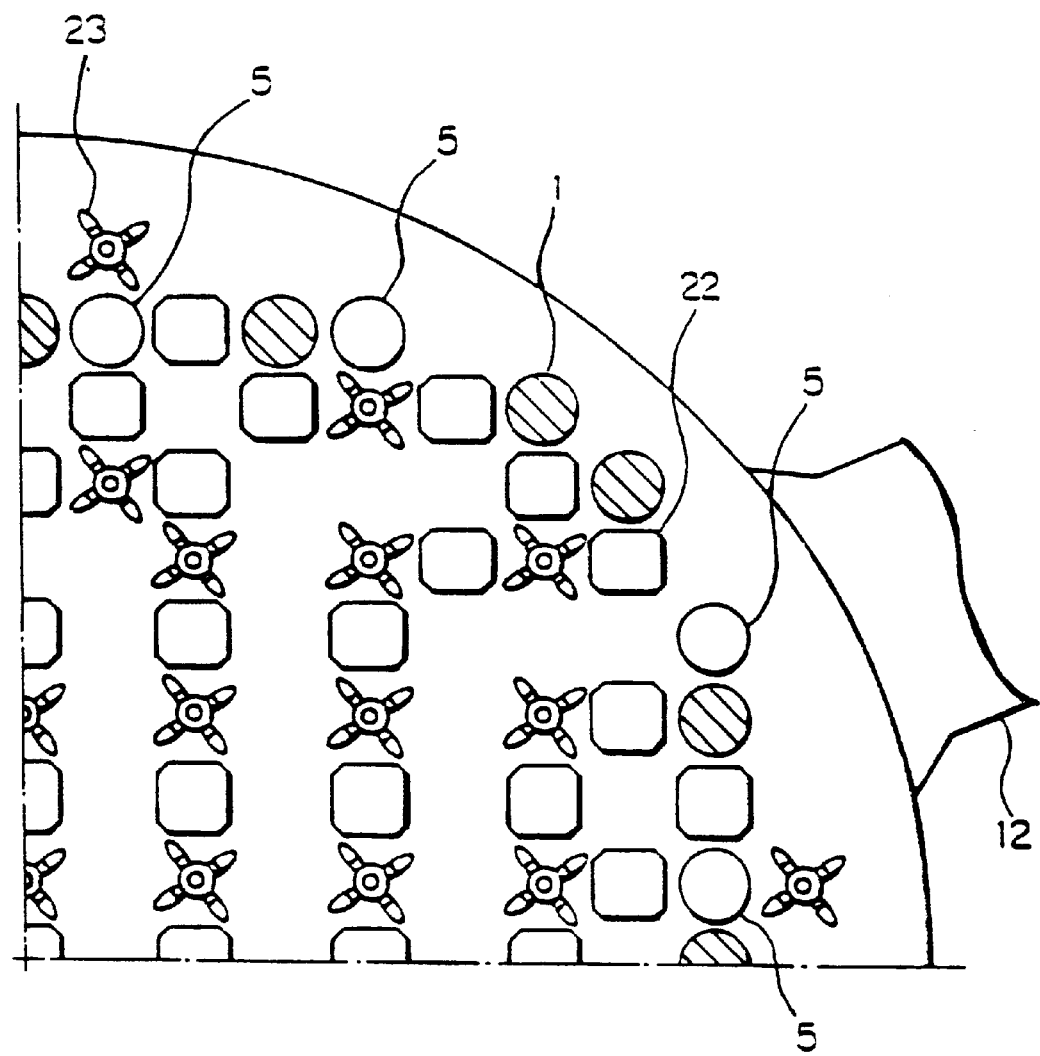
FIG. 2 is a quarter plan view for illustrating schematically a dispositional layout of individual component members of a structure disposed within the upper plenum.
Figure 3:
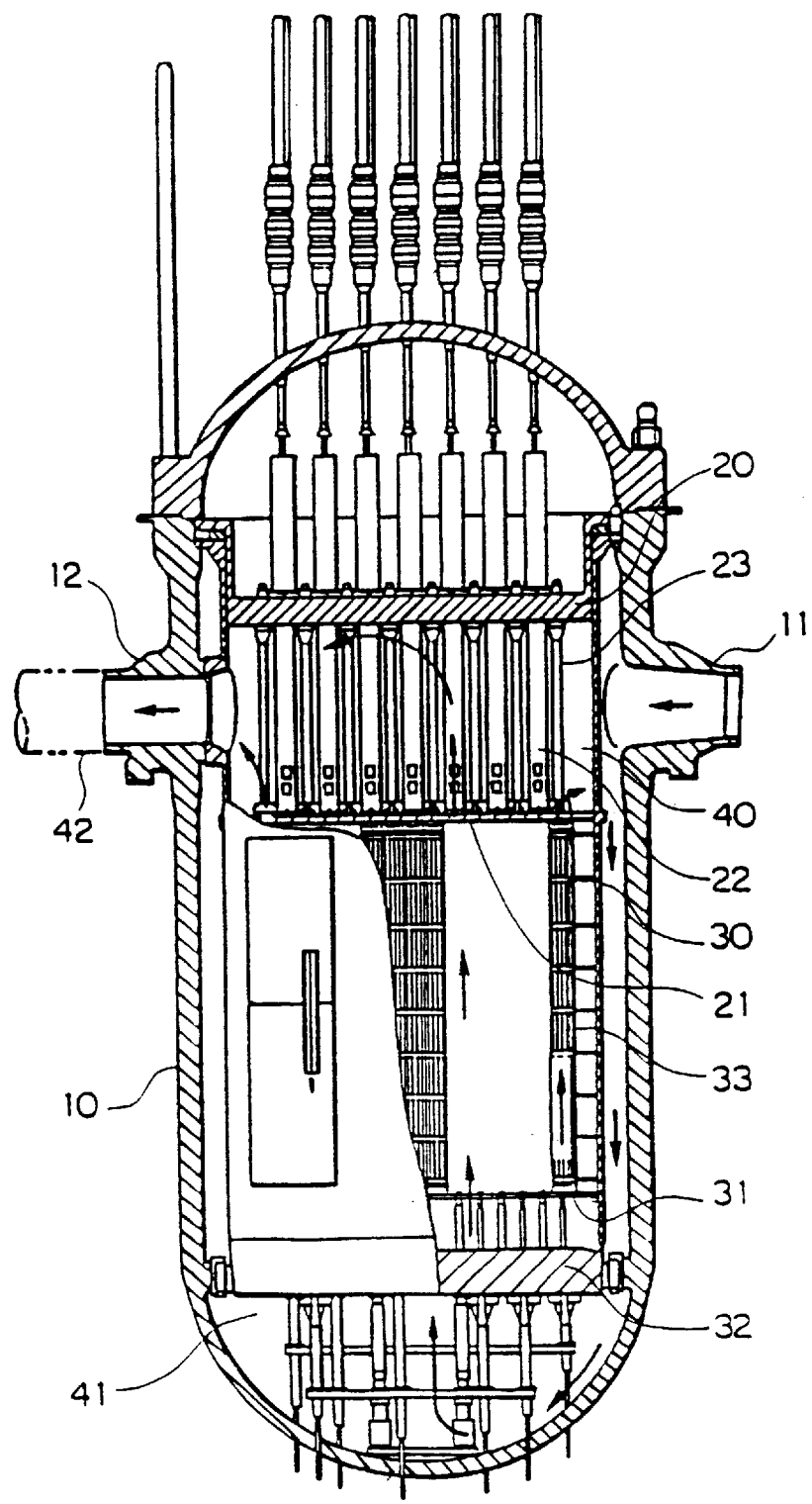
FIG. 3 is a vertical sectional view for illustrating schematically a conventional pressurized water reactor known heretofore.
Figure 4:
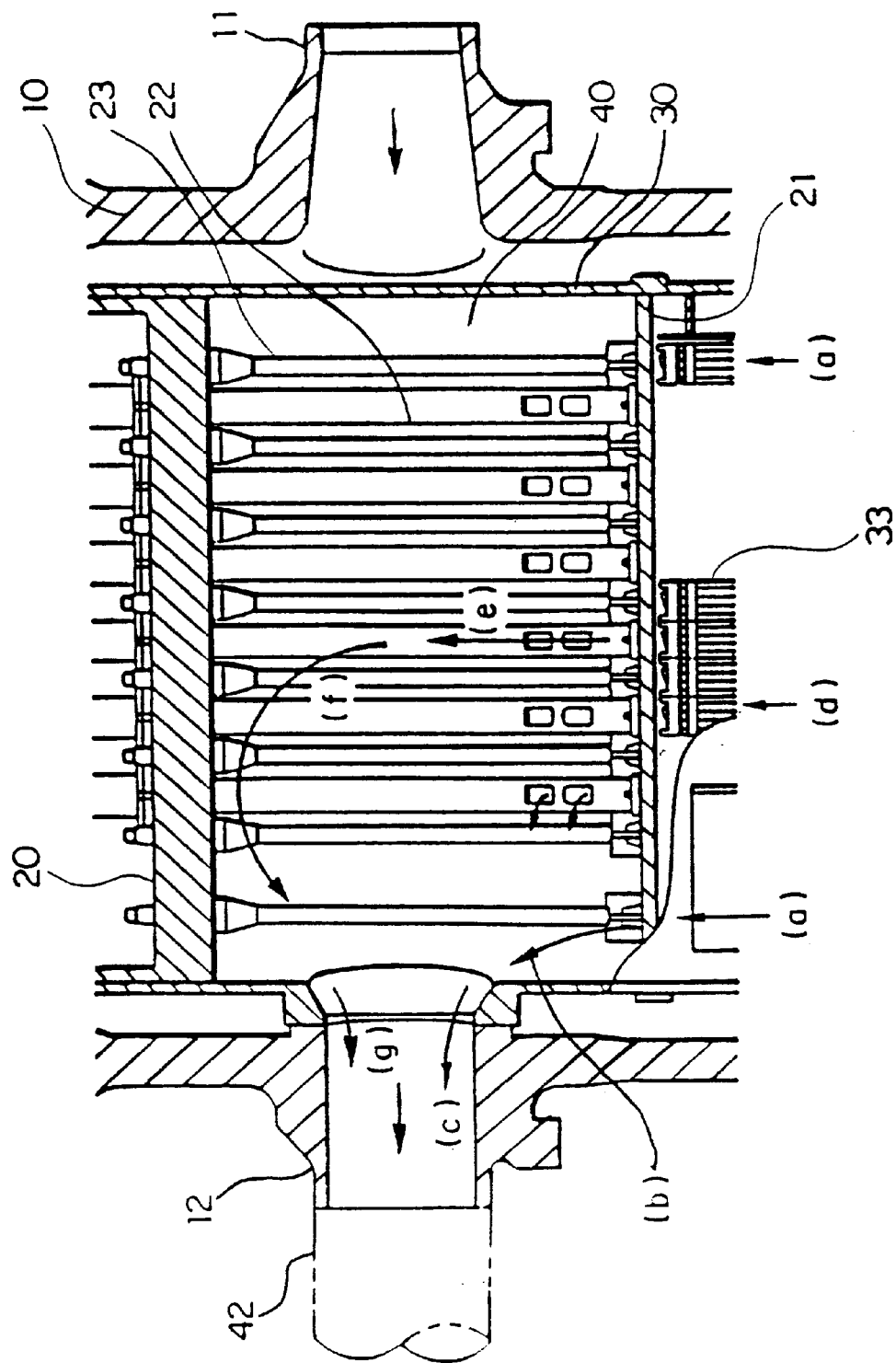
FIG. 4 is a fragmentary enlarged view showing a major portion of the conventional reactor around a upper plenum thereof.
Figure 5:
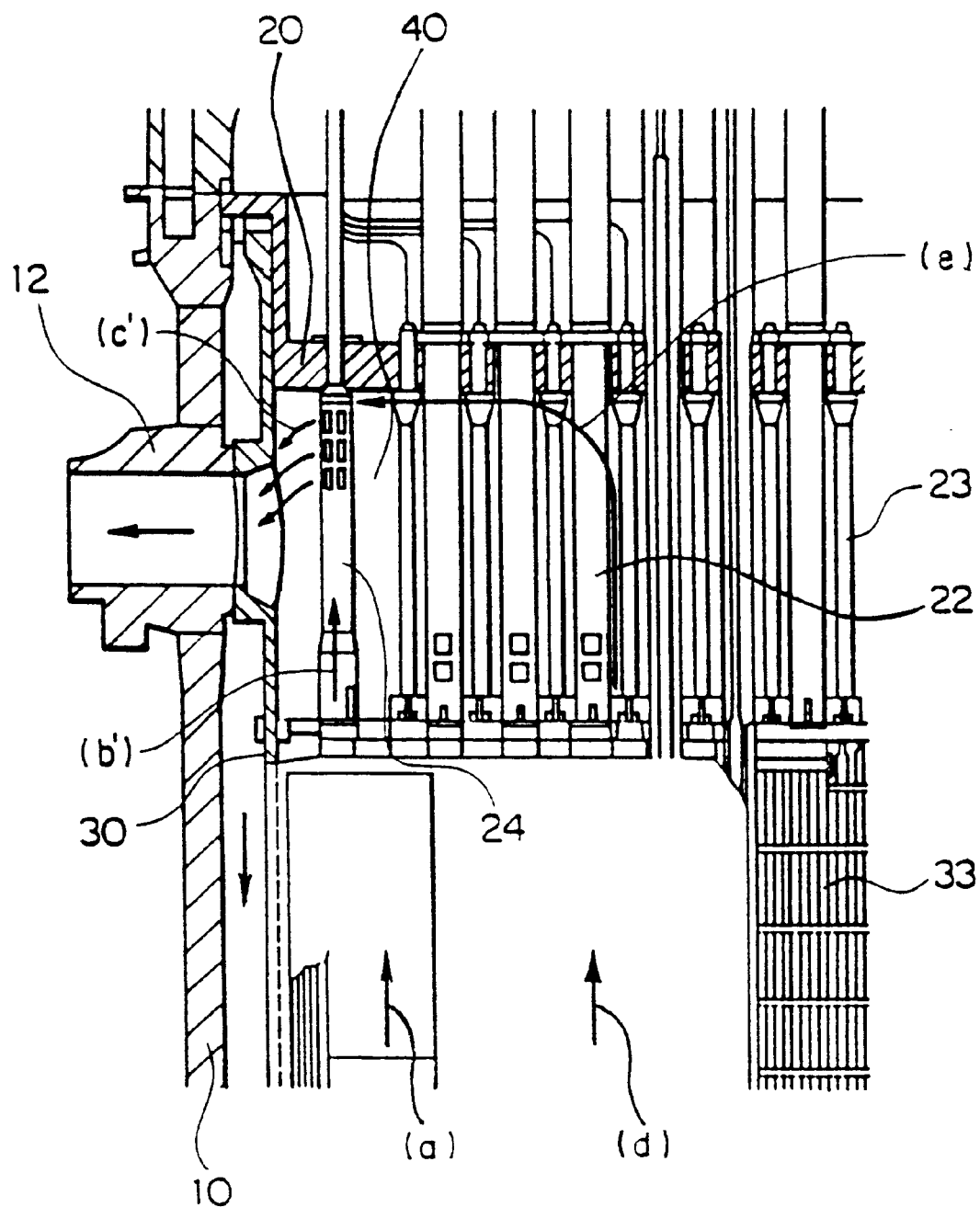
FIG. 5 is a fragmentary enlarged view for illustrating a major portion of the conventional reactor around a upper plenum equipped with slot-formed tubes of a large diameter known heretofore.

Now, description will turn to disposition of the short-length tubes 5 within the upper plenum 40 by reference to FIG. 2. FIG. 2 is a plan view of a quarter cross section of the nuclear reactor vessel 10 and shows only major structural members disposed within the upper plenum 40. In this case, the slot-formed tube 1 mentioned above is also employed in combination with the short-length tube 5 according to the invention. In FIG. 2, each of the control rod cluster guide tubes 22 is shown in the form of a plain rectangle, the upper core support columns 23 are represented by X-like patterns, respectively, and the slot-formed tubes 1 are indicated by hatched circles, respectively. Further, the positions at which the short-length tubes 5 according to the present invention are mounted are indicated by plain circles, respectively.

Next, description will be made of the flow behaviors of coolant or light water within the core in the nuclear reactor vessel 10 having the upper plenum 40 within which the short-length tubes 5 with the structure described above are installed. In this conjunction, it is noted that the flow behaviors of the light water is, for the most part, similar to that in the conventional reactor described hereinbefore. Accordingly, the following description will be directed to the flows or streams of light water within the upper plenum 40 and the outlet nozzle 12 by reference to FIG. 1.

As described hereinbefore, the stream (indicated by an arrow d) of the coolant or light water flowing through the center portion of the reactor core where the nuclear fission reaction is vigorous is heated at a relatively high rate up to a relatively high temperature. Then, the heated coolant leaves the reactor core into the upper plenum 40 and flows along and through the control rod cluster guide tubes 22. Thus, the coolant reaches the lower surface of the upper core support plate 20 to be thereby deflected in a transverse direction toward the outlet nozzle 12, as indicated by the arrows e and f in FIG. 2. On the other hand, the peripheral stream a of the coolant flowing through the peripheral portion of the reactor core where the neutron flux density is relatively low is heated to a temperature which is relatively low when compared with the center stream of the coolant. Thus, the coolant passed through the peripheral portion of the reactor core enters the upper plenum 40 from the reactor core at a relatively low temperature and flows into the short-length tubes 5 disposed appropriately to be finally ejected therefrom upwardly into the upper plenum 40 through the open top ends of tubes 5. Although the open top end is positioned at a height lower than the bottom end of the outlet nozzle 12, the coolant can be ejected upwardly from the top end of the short-length tubes 5 under the effect of inertia of the coolant flowing therethrough and can flow toward the outlet nozzle 12 within the upper plenum 40, as indicated by arrow b'.

As will now be appreciated, owing to the arrangement that at least some part of the coolant of relatively low temperature is ejected upwardly through the short-length tubes 5 in the manner described above, the peripheral coolant stream of relatively low temperature and the center coolant stream of relatively high temperature are intermingled or intermixed to a sufficient extent, whereon the intermixed coolant flows into the outlet nozzle 12, as indicated generally by an arrow A. As a result of this, temperature distribution of the coolant (i.e., light water) flowing through the outlet nozzle 12 can be made uniform. Thus, the mean temperature of the coolant can be measured with high accuracy and reliability.

Furthermore, the short-length tubes 5 allow the center coolant stream of high temperature to flow smoothly above the short-length tubes 5 toward the outlet nozzle 12 because of the short length of the tubes 5. Thus, the hydrodynamic load applied to the structural member disposed in the vicinity of the outlet nozzle 12 can be reduced. Furthermore, intermixing of the peripheral coolant stream of low temperature and the center coolant stream of high temperature can be promoted further.

Additionally, when the short-length tube 5 according to the present invention is employed in combination with the slot-formed tube 1, there can be obtained advantageous effects provided by the slot-formed tube 1. More specifically, some part of the coolant of relatively low temperature flows into the upper plenum 40 from the slot 2 formed in the slot-formed tube 1 at a location corresponding to the height of the outlet nozzle 12. Thus, the peripheral coolant stream of relatively low temperature and the center coolant steam of relatively high temperature can be intermixed appropriately, whereon the intermixed coolant flows into the outlet nozzle 12, as indicated generally by the arrow A. As a result of this, the temperature distribution of the coolant (i.e., light water) flowing through the outlet nozzle 12 is made more uniform. Thus, the coolant intermixed more sufficiently can flow through the outlet pipe 42 to ensure measurement of the mean temperature of the coolant with enhanced accuracy.

In the foregoing, exemplary embodiments of the present invention which are considered preferable at present and other alternative embodiments have been described in detail by reference to the drawings. It should, however, be noted that the present invention is never restricted to these embodiments but other numerous variations and modifications of the structure for promoting intermixing of the heated fluid streams can be easily conceived and realized by those skilled in the art without departing from the spirit and scope of the present invention.

What is claimed is:

1. A structure for promoting intermixing of heated fluid streams in a nuclear reactor, said structure being disposed within a upper plenum (40) defined within a nuclear reactor vessel (10) of said nuclear reactor above a core having a low temperature region (a) and a high temperature region (d) where a heated fluid flows at a low temperature and a high temperature, respectively, said upper plenum (40) being hydraulically communicated to an outlet nozzle (12) installed at a side wall of said nuclear reactor vessel (10), said intermixing promoting structure comprising:

heated fluid guide members each formed in a short length and installed within said upper plenum (40) for guiding said heated fluid (b') flowing out from said low temperature region (a) of said reactor core to the vicinity of said outlet nozzle (12).

2. A structure for promoting intermixing of heated fluid streams in a nuclear reactor as set forth in claim 1, wherein the length of said short-length heated fluid guide member is selected such that a top end thereof is positioned at a height lower than that of a bottom of a bore of said outlet nozzle (12) and higher than a middle position between the bottom of said bore of said outlet nozzle (12) and an upper surface of an upper core plate (21).

3. A structure for promoting intermixing of heated fluid streams in a nuclear reactor as set forth in claim 1, wherein said heated fluid guide members of short length are disposed at available positions, respectively, in an outer peripheral portion of said upper plenum (40) where neither upper core support columns (23) nor control rod cluster guide tubes (22) are disposed.

4. A structure for promoting intermixing of heated fluid streams in a nuclear reactor as set forth in claim 1, wherein said heated fluid guide members of short length are disposed at positions in an outer peripheral portion of said upper plenum (40) which corresponds to an outer peripheral portion of said reactor core.

5. A structure for promoting intermixing of heated fluid streams in a nuclear reactor as set forth in claim 2, wherein said heated fluid guide members of short length are disposed at available positions, respectively, in an outer peripheral portion of said upper plenum (40) where neither upper core support columns (23) nor control rod cluster guide tubes (22) are disposed.

6. A structure for promoting intermixing of heated fluid streams in a nuclear reactor as set forth in claim 2, wherein said heated fluid guide members of short length are disposed at positions in an outer peripheral portion of said upper plenum (40) which corresponds to an outer peripheral portion of said reactor core.

* * * * *